US010516220B2

(12) United States Patent
Harms et al.

(10) Patent No.: US 10,516,220 B2
(45) Date of Patent: Dec. 24, 2019

(54) METHOD FOR COHESIVE JOINING TO A CABLE END, AND ALSO CONFIGURED CABLE

(71) Applicant: Lisa Draexlmaier GmbH, Vilsbiburg (DE)

(72) Inventors: Alexander Harms, Oebisfelde (DE); Marc Essers, Aachen (DE); Alexander Schiebahn, Langerwehe (DE); Uwe Reisgen, Eschweiler (DE); Markus Schleser, Langerwehe (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 1077 days.

(21) Appl. No.: 14/770,695

(22) PCT Filed: Feb. 26, 2014

(86) PCT No.: PCT/DE2014/100068
§ 371 (c)(1),
(2) Date: Aug. 26, 2015

(87) PCT Pub. No.: WO2014/131402
PCT Pub. Date: Sep. 4, 2014

(65) Prior Publication Data
US 2016/0006138 A1 Jan. 7, 2016

(30) Foreign Application Priority Data
Feb. 26, 2013 (DE) .................. 10 2013 101 876

(51) Int. Cl.
*H01R 4/20* (2006.01)
*B23K 20/10* (2006.01)
(Continued)

(52) U.S. Cl.
CPC ............ *H01R 4/20* (2013.01); *B23K 11/0026* (2013.01); *B23K 11/0073* (2013.01);
(Continued)

(58) Field of Classification Search
USPC .......................................... 439/427
See application file for complete search history.

(56) References Cited

U.S. PATENT DOCUMENTS 1,929,202 A * 10/1933 Hahn ...................... H01T 13/24
174/397
4,917,623 A * 4/1990 Grabbe .................. H01R 13/28
439/284
(Continued)

FOREIGN PATENT DOCUMENTS

DE     4440189 A1 * 9/1995    ........... H01R 4/5033
DE     4440189 A1   9/1995
(Continued)

*Primary Examiner* — William H. Mayo, III
*Assistant Examiner* — Krystal Robinson
(74) *Attorney, Agent, or Firm* — Finnegan, Henderson, Farabow, Garrett & Dunner LLP

(57) ABSTRACT

The invention proposes a method for cohesive joining to a cable end (1), in which method a welding tool element (30, 37, 41, 43, 45, 48, 53) is fitted on an open bundle end of individual cores (2, 15) of the cable end (1), welding energy is fed into the individual cores (2, 15), and the welding tool element (30, 37, 41, 43, 45, 48, 53) is removed from the bundle end. In the process, an engagement recess (7, 21) can be formed in the open bundle end, an engagement pin (6, 20, 31, 38, 42, 44, 46, 49, 54) of the welding tool element (30, 37, 41, 43, 45, 48, 53) can engage into the engagement recess (7, 21), and at least a portion of the welding energy can be fed via the engagement recess (7, 21). A configured cable comprising individual cores (2, 15) with a receiving sleeve (4, 16, 33) is also presented, wherein the receiving sleeve (4, 16, 33) has an inlet opening (9) for a bundle (3)
(Continued)

Figure 1:
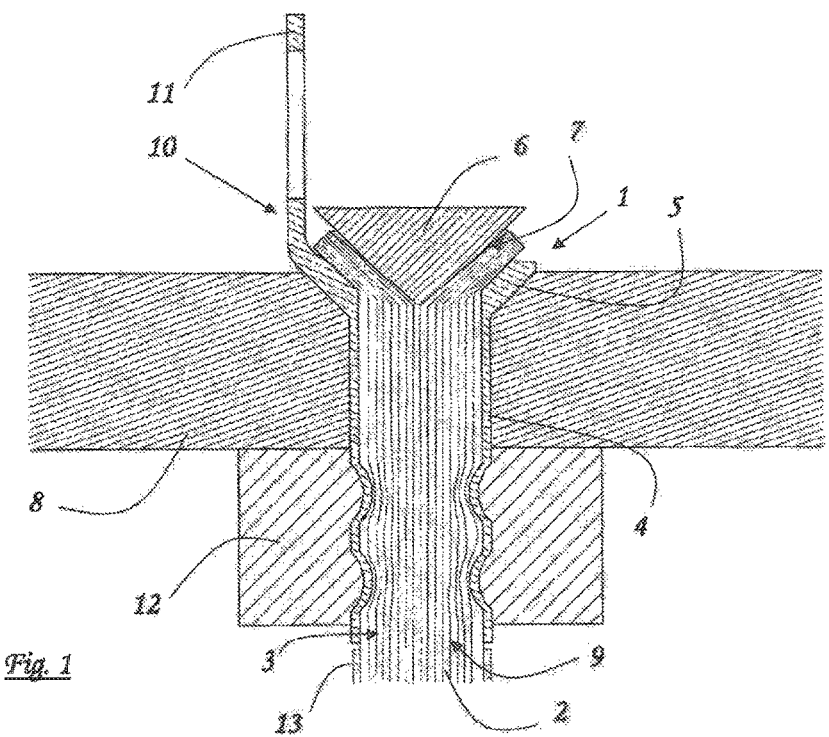

of the individual cores (2, 15), the receiving sleeve (4, 16, 33) has an end piece (5, 18) which is widened in relation to the inlet opening (9), and there is, at least also in the widened end piece (5, 18), a cohesive connection between at least one subset of the individual cores (2, 15) with respect to one another and/or between at least a subset of the individual cores (2, 15) and the receiving sleeve (4, 16, 33).

19 Claims, 5 Drawing Sheets

(51) Int. Cl.
| | |
|---|---|
| *B23K 20/12* | (2006.01) |
| *B23K 11/00* | (2006.01) |
| *B23K 11/02* | (2006.01) |
| *H01R 4/18* | (2006.01) |
| *H01R 4/62* | (2006.01) |
| *H01R 43/02* | (2006.01) |
| *B23K 20/00* | (2006.01) |
| *B23K 31/02* | (2006.01) |
| *H01R 11/12* | (2006.01) |
| *H01R 43/048* | (2006.01) |
| *B23K 101/00* | (2006.01) |
| *B23K 101/32* | (2006.01) |
| *B23K 101/38* | (2006.01) |
| *B23K 103/10* | (2006.01) |

(52) U.S. Cl.
CPC ............ *B23K 11/02* (2013.01); *B23K 20/002* (2013.01); *B23K 20/10* (2013.01); *B23K 20/12* (2013.01); *B23K 20/129* (2013.01); *B23K 31/02* (2013.01); *H01R 4/187* (2013.01); *H01R 4/625* (2013.01); *H01R 43/0207* (2013.01); *H01R 43/0214* (2013.01); *B23K 2101/006* (2018.08); *B23K 2101/32* (2018.08); *B23K 2101/38* (2018.08); *B23K 2103/10* (2018.08); *H01R 11/12* (2013.01); *H01R 43/0484* (2013.01); *H01R 2201/26* (2013.01)

(56) References Cited

U.S. PATENT DOCUMENTS

| | | | |
|---|---|---|---|
| 4,922,072 A * | 5/1990 | Topel | B23K 11/002 |
| | | | 219/56.1 |
| 6,538,203 B1 | 3/2003 | Nolle et al. | |
| 7,226,308 B1 * | 6/2007 | Hanks | H01R 4/5033 |
| | | | 29/857 |
| 8,448,836 B2 | 5/2013 | Schloms et al. | |
| 2003/0207610 A1 * | 11/2003 | Lindemann | H01R 4/5033 |
| | | | 439/427 |
| 2009/0249616 A1 | 10/2009 | Froschl | |
| 2011/0295298 A1 * | 12/2011 | Moszner | A61B 17/0057 |
| | | | 606/191 |
| 2013/0199841 A1 | 8/2013 | Lehmann | |
| 2016/0006138 A1 * | 1/2016 | Harms | B23K 20/10 |
| | | | 174/74 A |

FOREIGN PATENT DOCUMENTS

| | | |
|---|---|---|
| DE | 10346160 B3 | 7/2005 |
| DE | 102011018353 A1 | 10/2012 |

* cited by examiner

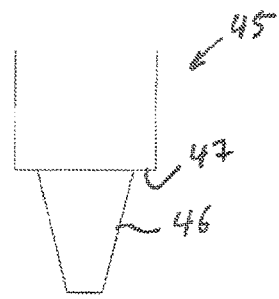
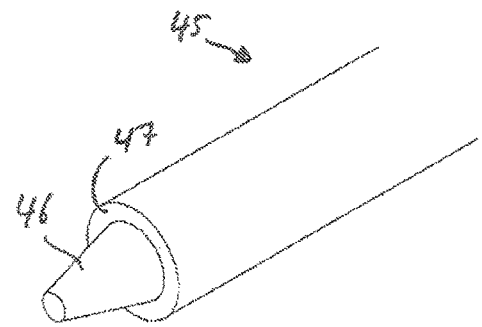
Fig. 10a    Fig. 10b
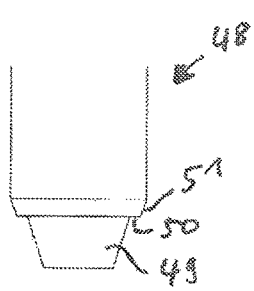
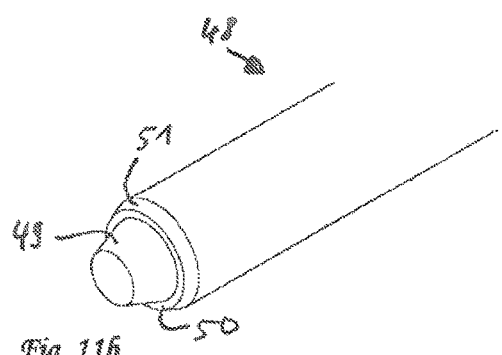
Fig. 11a    Fig. 11b
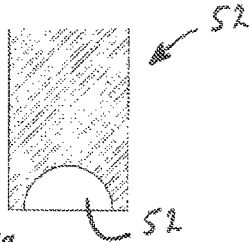
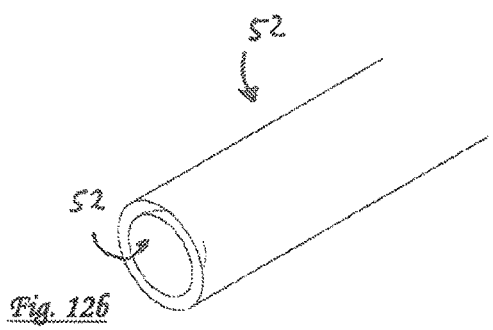
Fig. 12a    Fig. 12b

METHOD FOR COHESIVE JOINING TO A CABLE END, AND ALSO CONFIGURED CABLE

The invention relates to a method for materially joining at a cable end, and to a configured cable, as per the preamble of claim 19.

A cable, constructed from individual strands, of the invention under discussion here may be an electrical or electronic cable, for example a stranded wire, in which at least a subset of the individual strands are electrical individual conductors.

The invention however also relates generally to cables which are constructed from individual strands for purposes other than electrical or electronic purposes, wherein the individual strands may also be composed of materials other than metallic materials, for example from plastic, such as for example in the case of a plastics cord.

In automotive engineering, use is increasingly made of stranded wires, composed in particular of aluminum, with large cross sections. Permanent contacting of an end of such a stranded wire to a connector element, for example a cable shoe, a connector adapter, a battery terminal, a plug connector part or some other component, is not without problems. Furthermore, the profile of a stranded wire may be terminated by way of an end node, or multiple stranded wires are connected to one another through the formation of a common end node. In this case, the end nodes should be mechanically durable, and durable with regard to the electrical contact between the interconnected stranded wires. A stranded wire will hereinafter also be referred to as stranded wire cable or simply as cable.

A method for materially joining at a cable end, and a configured cable, of the type mentioned in the introduction are known from EP 2 025 046 B1. In this case, a stripped free end of a stranded wire cable is inserted into a sleeve and is crimped with the latter. That end of a further electrically conductive component which is assigned to the stranded wire cable is inserted into the other end of the sleeve, said end being placed in contact with that end of the stranded wire cable which is crimped in the sleeve. Subsequently, the end of the stranded wire cable and the end of the inserted component are joined together by resistance welding. In this case, the melting point of the sleeve must be higher than the melting point of the components to be joined together. A disadvantage here is that the stranded wire face surface must be prepared in order that it can bear against the component in a suitable manner for the welding process. Furthermore, with the sleeve, a separate joining aid element is required.

EP 2160806 B1 has disclosed a method for the electrically conductive connection, by means of ultrasonic welding, of stranded wires to a U-shaped carrier composed of metal. In this case, the stranded wire is placed into the U-shaped carrier and is subjected to ultrasound by a sonotrode which acts thereon laterally.

For the ultrasonic welding, use is normally made of linear ultrasonic welding, which utilizes a linear oscillating movement of the ultrasonic oscillator system; however, experience has shown that linear ultrasonic welding reaches its limits when used in conjunction with stranded wire cables with large cable cross sections, for example cross sections of greater than 80 mm$^2$ depending on the material. An increasing stranded wire cross section makes it more difficult, also owing to an increasing degree of damping, to realize a homogenous coupling of the oscillation energy into the entirety of the stranded wire cross section. The formation of materially bonds between the individual strands therefore decreases with increasing distance from the sonotrode, to such an extent that such formation often occurs only in the region close to the sonotrode.

EP 1 032 077 B1 has disclosed a method for the materially joining of an aluminum cable to a connector element composed of copper or of some other metal, and a configured cable of the type mentioned in the introduction. In the disclosure of said document, the stripped end of the aluminum cable is equipped with a supporting sleeve which is crimped with and/or shrink-fitted onto the aluminum cable, such that the individual wires of the aluminum cable are compressed at least in the region of the face side. The connector element is subsequently welded to the face side, formed from the individual wires, of the end of the aluminum cable. Said document discloses in particular a rotational friction welding process.

From EP 2 227 347 B1, it is known for the method presented immediately above and the configured cable presented immediately above to be further developed by virtue of the face sides being joined to one another by torsional ultrasonic welding. Both EP 1 032 077 B1 and EP 2 227 347 B1 require, for the production of the joining connection, as planar as possible a face side, the realization of which can be cumbersome. The torsional ultrasonic welding process requires rotationally symmetrical welding regions. Furthermore, the torsional ultrasonic welding of planar face surfaces has the result that the circumferential speed of the relative movement between the elements to be welded becomes smaller toward the central point of the torsional movement. Correspondingly, the input of energy varies over the cross section, such that it is questionable as to whether uniform weld seam quality can be achieved over the entire cross section. A further disadvantage is the required crimping of the stranded wire end to the supporting sleeve.

DE 10 2010 003 599 A1 has disclosed a method for manufacturing cables and a manufactured cable, wherein it is disclosed in said document to introduce an elongate, in particular pin-like counterbearing, which belongs to a connector element, between exposed individual wires of the cable, such that the individual conductors surround said counterbearing. A sleeve is positioned around the individual conductors and the counterbearing and is crimped to the individual conductors surrounding the counterbearing. For the crimping process, magnetic impulse welding is disclosed. Thus, the joining process is performed by cold welding by way of an impulse being applied to the sleeve from the outside. An impulse which is typical for magnetic impulse welding may have an adverse effect on sensitive electrical components. Furthermore, the machine dimensions required for magnetic impulse welding are relatively large. A further disadvantage is the need for a sleeve as an additional element.

DE 103 46 160 B3 has disclosed a method and a connection for the contacting of an aluminum cable, wherein the aluminum cable constructed from individual conductors is pushed, by way of the face side of the stripped end of the cable, over a tin-plated contact terminal, and a connection is produced by ultrasonic tin-plating in a liquid tin bath or by tungsten inert gas welding or by metal inert gas welding or by laser welding.

DE 10 2010 044 241 has disclosed a method for producing a connection of an electrical aluminum cable formed from multiple aluminum wires to a connector part for electrical installations, in which method the connector part has a sleeve for receiving the end of the aluminum cable, and the aluminum cable is soldered to the sleeve of the connector part using a solder promoter.

DE 10 2008 031 588 B4 has disclosed a connecting element for the electrical connection between a light-metal cable and an electrical contact, in the case of which connecting element the light-metal cable is cold-welded to a metal sleeve and a contact element is connected in electrically conductive fashion to the metal sleeve by way of a hardened liquid. The contact element can be connected to the contact.

DE 10 2010 027 033 A1 has disclosed a conductor with a contact part which is connected to the conductor by way of a connector part, wherein the connector part comprises at least one crimped connection. The crimped connection surrounds at least a partial region of the conductor, wherein the conductor and the contact part are connected to one another by way of a laser-welded connection.

EP 2022144 B1 has disclosed a method for producing a passage or end node, which has a polygonal geometry in cross section, from electrical conductors. For this purpose, the stranded wires are compacted in a compaction chamber and subsequently welded by way of ultrasound. In this case, too, the contact between the welding tool and the stranded wire is realized in a direction perpendicular to the longitudinal extent of the stranded wire.

DE 4117696 C1 has disclosed a device for the welding of the strands of a stranded wire composed of copper to form a firm and gas-tight connector node. A section of the stranded wire is placed into a compaction chamber and is welded by resistance welding. The action of the electrodes on the stranded wire is likewise oriented perpendicular to the longitudinal extent of the stranded wire.

It is now the object of the present invention to provide an alternative method of the type mentioned in the introduction, and an alternative configured cable, in relation to the prior art, by means of which method and cable a particularly reliable joining connection to individual strands is ensured.

In the case of a method of the type mentioned in the introduction, said object is achieved by means of the features of independent claim 1 and of independent claim 4.

Advantageous embodiments of the method according to the invention will emerge from the features of dependent claims 2, 3 and 5 to 18.

In the case of a configured cable of the type mentioned in the introduction, the object is achieved by means of the characterizing features of claim 19. Advantageous embodiments of the cable according to the invention will emerge from the characterizing features of claims 20 to 23.

In a first variant of the method according to the invention, a welding tool element is mounted onto an open bundle end of individual strands of the cable end. Welding energy is introduced into the individual strands and, subsequently, the welding tool element is removed from the bundle end. With the removal of the welding tool element, this method differs from the approaches known from the prior art, for example EP 1 032 077 B1, in which the bundle end is connected to a further element, for example an electrical connector piece, by rotary friction welding or torsional ultrasonic welding and, in the process, the further element serves as a welding tool element which introduces welding energy into the individual strands of the open bundle end and is simultaneously a joining partner.

The welding tool element is mounted onto the individual strands in the longitudinal direction of the cable end. With the introduction of the welding energy into the bundle end, at least a subset of the individual strands is at least partially plasticized or melted. With the assistance of a contact pressure, acting in the longitudinal direction of a cable end at the same time, of the welding tool element, a compaction of the material of the individual strands, which undergo a materially bond, in the bundle end can be achieved. The compaction is conducive to a penetration of the welding energy deep into the bundle end, and thus to the realization of a stable joining connection between the individual strands. A further joining partner is not required, though may be provided if necessary, for example a receiving sleeve which surrounds the circumference of the bundle end.

The welding tool element may take different forms, for example the form of a spur with a planar end surface provided for mounting on to the bundle end.

The method according to the invention may also be carried out in such a way that the bundle end is inserted into a receptacle, formed by a depression, of the welding tool element. In this case, the outer individual strands of the open bundle end, or an element, for example a sleeve, surrounding the individual strands, bear(s) against the inner wall of the receptacle and can be supplied directly with welding energy via said contact. The shell surfaces of the outer individual strands or the surrounding element are in this case directly accessible to the welding tool element.

The method according to the invention may also be carried out in such a way that an engagement hollow is formed into the open bundle end, the engagement hollow is engaged into by an engagement pin of the welding tool element, and at least some of the welding energy is introduced via the engagement hollow.

Through the creation of an engagement hollow, the bundle of individual strands is split, and the welding tool element can be guided axially in the longitudinal direction of the cable end onto the open bundle end, and in the process can access a larger area of action than in the case of a non-split bundle. In the engagement hollow, the engagement pin can act directly on the lateral surfaces of the individual strands bearing against the tool element. By virtue of the engagement pin being pressed into the engagement hollow, the pressing-in force acts not only on the tips of the individual strand ends, that is to say in the longitudinal direction of the individual strands, but with a pressing action on the individual strand lateral surfaces, whereby the individual strands can be compacted against one another in a particularly effective manner, in particular after a plasticization or melting of the individual strands has already commenced owing to the introduction of the welding energy. In this way, the supply of energy can be made efficient, and a compact joint can be achieved.

The joining connections produced by way of the welding energy may be restricted to the joints between individual strands, for example for the generation of a cable terminal. Further joining partners do not imperatively need to be involved, though may be provided if necessary, for example a receiving sleeve which surrounds the circumference of the bundle end.

The object is also achieved by means of the features of the parallel claim 4. The method claimed therein corresponds substantially to the method as claimed in claim 3. By contrast to said claim 3, however, it is the case in claim 4 that the engagement pin remains as part of the fully joined cable end as a joining partner in the engagement hollow, and can thus in particular contribute to improved stability and/or an improved sealing action of the joined cable end.

The engagement hollow may be produced by way of a separate engagement pin. It may however be advantageous for the engagement pin that produces the engagement hollow to serve as a welding tool element or as part thereof. In this way, the introduction of the welding energy can be performed, without a tool change, immediately after the production of the engagement hollow. The engagement pin will hereinafter be referred to as spur, without this referring to a particular geometrical shape of the engagement pin.

It may be advantageous for there to be provided on the welding tool element, around the engagement pin, a ring-shaped receptacle which is surrounded by an encircling outer side wall and in which the bundle end, or at least a partial bundle of the same, is received. In this way, it is also possible for welding energy to be introduced directly into the lateral surfaces of the individual strands that are bearing against the side wall.

If an engagement hollow is provided in the bundle end, the engagement pin, or spur, which engages into the engagement hollow may assume a variety of shapes, and preferably has a tapering shape toward the front end provided for insertion into the open bundle end. Thus, at least the front-end of the engagement pin may be of conical or frustoconical form. A hemispherical form or other tapering forms may likewise be expedient. Steps or bevels may be provided. The engagement pin may be integrally connected to the rest of the welding tool element or may be detachably or non-detachably fixed to the rest of the welding tool element.

For the method according to the invention, as a welding process, use may preferably be made of friction welding by means of a rotating welding tool element. Friction welding has the advantage that good joining results can be attained even in the case of large cross sections of the bundle end of for example greater than 80 mm$^2$. Such large cross sections are increasingly used for electrical cables in the automotive engineering sector. Furthermore, use may also be made of ultrasonic welding, preferably torsional ultrasonic welding. Alternatively, resistance welding may also be used.

It may furthermore be advantageous for different welding methods in combination to be used in succession or simultaneously. Accordingly, it would be possible for the resistance welding to be used in a preparatory manner or at the same time as a further welding method, for example friction welding or (torsional) ultrasonic welding.

The method according to the invention may also be carried out in such a way that the open bundle end is surrounded by a receiving sleeve. In particular in the case of plastics cables composed for example of a thermoplastic material, said receiving sleeve may be a plastics sleeve. In the case of metallic, in particular electrical cables, a metallic receiving sleeve may be provided, for example for the purposes of electrical contacting of the cable end with a further element. Provision may however also be made of receiving sleeves composed of other materials, for example electrically insulating materials.

If an engagement hollow is formed into the bundle end, it may be advantageous for a widened end piece to be provided on the receiving sleeve, which end piece receives the bundle end which has the engagement hollow. During the welding process, at least a subset of the individual strands can, by way of their strand ends, be pressed against the inner wall of the end piece of the receiving sleeve by the welding tool element.

With the widened end piece, the receiving sleeve provides the space for the engagement hollow. In a variant of the method according to the invention, the widening of the end piece of the receiving sleeve is realized or produced as a result of the insertion of the engagement pin or spur. The widening may however also have already been completely or partially produced during the manufacture or preparation of the receiving sleeve, before the insertion of the engagement pin.

With the insertion of the engagement pin, at least a subset of the individual strands surrounding the engagement hollow bear against the inner wall of the widened end piece. By means of the welding tool element, welding energy for a welding process is introduced via the engagement hollow. In this way, the individual strands can enter into a materially bond with one another and/or with the inner wall of the end piece of the receiving sleeve.

As a result of the creation of the engagement hollow, the bundle of individual strands is split. It is achieved in this way that the cross section to be joined, which relates to the region between the welding tool element and the receiving sleeve, is reduced, such that the energy introduced for the welding process does not need to be introduced over the entire cross section of the non-split bundle end.

The engagement pin may be adapted to the shape of the widened end piece, which may be of conical or other form, for example cup-shaped form. A shape of the engagement pin adapted to the end piece would mean that the outer wall of the engagement pin and the inner wall of the end piece run parallel to one another at least in sections. In the case of a conical shape, the cone angles of the spur and of the widened end piece would correspond. Since the packing density of the individual strands decreases with increasing radius of the widened end piece, it would, in the case of parallel walls of end piece and engagement pin, be the case that the engagement pin would not be able to press the individual strands uniformly against the inner wall of the end piece over the entire circumference. This effect can occur even in the case of an engagement pin shape not adapted to the end piece.

Here, the decreasing packing density of the individual strands in the widened end piece, as discussed above, need not be a disadvantage. It is possible for the individual strand pieces which bear in compact fashion against the receiving sleeve after the insertion of the engagement pin to firstly be joined to one another and/or to the receiving sleeve. Said individual strands soften and are compacted, such that subsequently, the adjoining individual strand pieces are also connected to one another and/or to the receiving sleeve. Thus, a flowing connection toward the end of the open bundle is realized.

It would also be conceivable for the welding tool element to be operated in a rotating pivoting movement, such that, in succession, all of the individual strand ends, even in the widened end piece, are pressed against one another and against a wall of the end piece and, in said state, are joined to one another and/or to the end piece. In this way, the connection surface area can be increased, and thus the connection quality can be improved. Furthermore, the welding process can be performed with relatively low forces.

Since, during the welding process, it is generally also the case that individual strands are joined to one another, a reliable joining connection can be attained. The joining connection may even be formed in a part of the receiving sleeve which does not belong to the widened end piece.

The engagement pin may also be shaped such that its outer walls do not run parallel to the inner walls of the widened end piece, and instead, may be designed such that, over the entire widened end piece, the individual strands are pressed by the engagement pin against the inner wall of the end piece.

It may be advantageous for the receiving sleeve to be fixed in non-positively locking and/or positively locking fashion to the cable before the welding process, for example by way of a pressing or crimping process.

If the engagement pin is used as a welding tool element or as part thereof and is not fixed or is detachably fixed to the welding tool, it may be advantageous, after the completion of the welding process, for example in the case of friction welding, for the engagement pin to be left integrally joined to the individual strands in the fully configured cable, whereby the joining action between cable and receiving sleeve can be intensified and, furthermore, a visually clean termination of the cable can be achieved.

The receiving sleeve may be a constituent part of a connector element provided for electrical contacting, for example of a cable shoe.

Preferred embodiments of the method according to the invention and of the cable configured according to the invention are presented below on the basis of figures.

Figure 2:
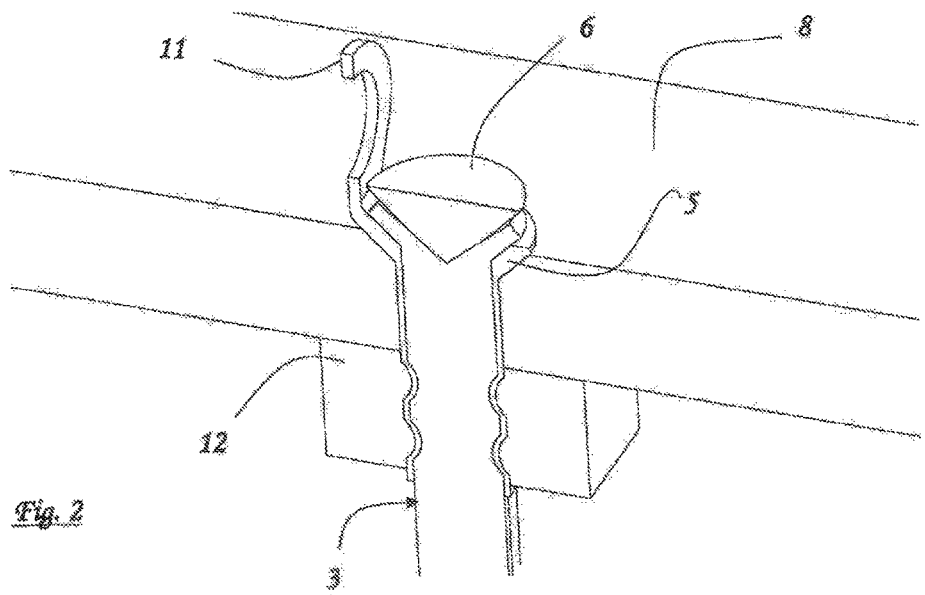
Figure 3:
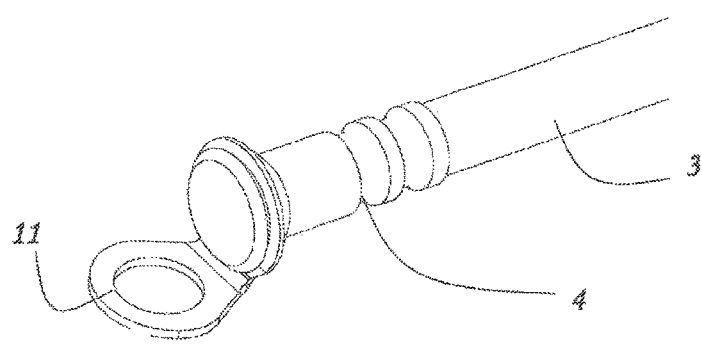
Figure 4:
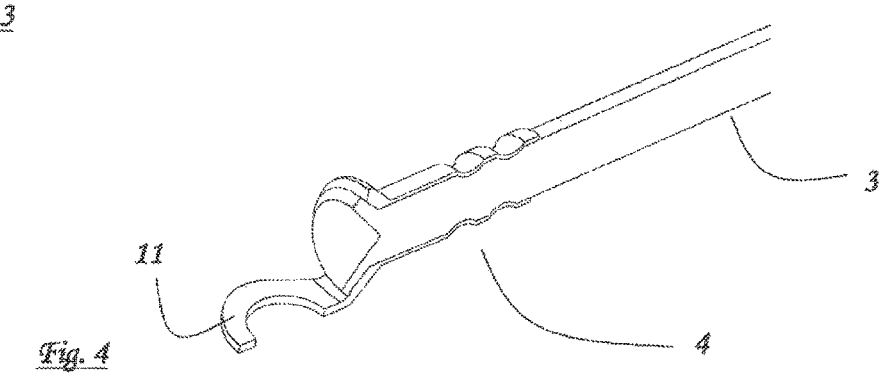
Figure 5:
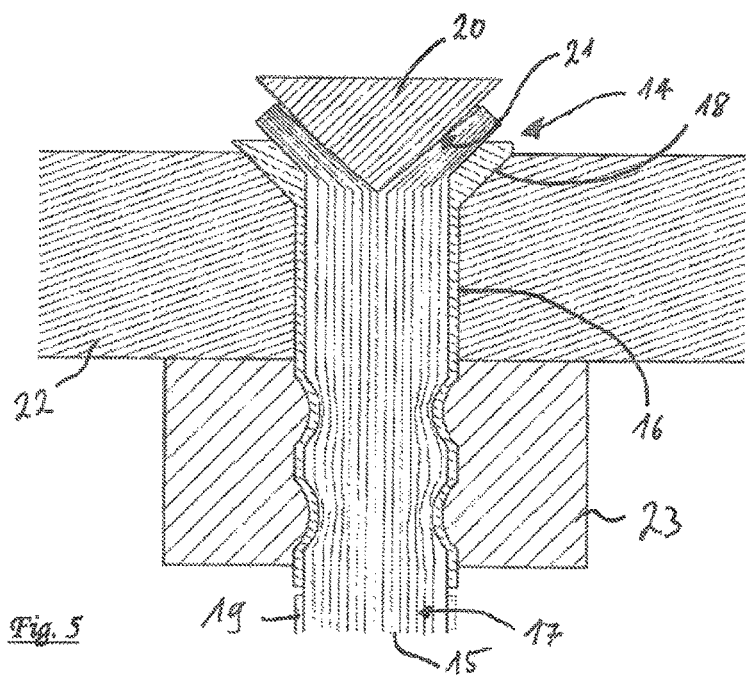
Figure 6:
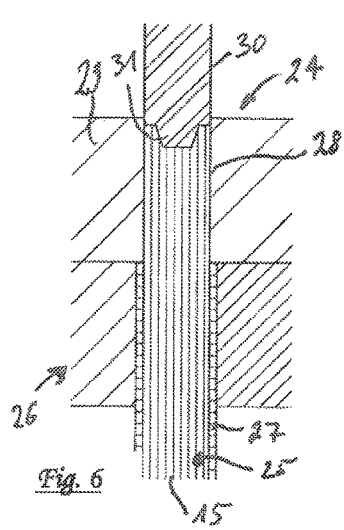
Figure 7:
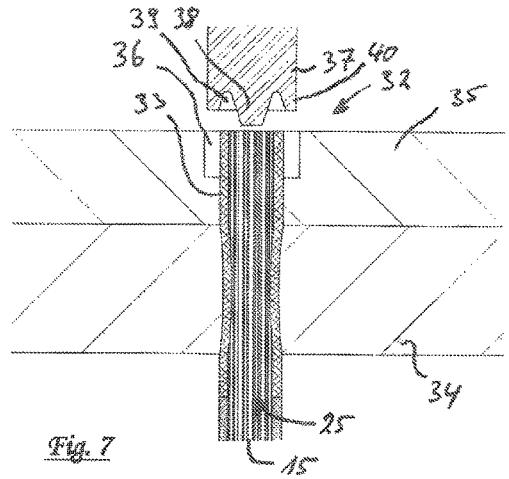

In the figures, in each case schematically:

FIG. 1 shows a cross section through a cable with connector element and with a spur in a setting device, FIG. 2 shows a cross section as per FIG. 1 in a perspective view, FIG. 3 shows a fully configured cable in an oblique plan view, FIG. 4 shows the fully configured cable as per FIG. 3 in a section, FIG. 5 shows a cross section through an end node, FIG. 6 shows the production of an end node with a modified geometry of the welding tool element, FIG. 7 shows an alternative illustration of the production of an end node with a further modified geometry of a welding tool element, and FIGS. 8a to 14b: show different geometries of welding tool elements.

FIGS. 1 and 2 schematically show, in cross section and in a sectional perspective view, a stranded wire cable 1 with a multiplicity of individual conductors 2 in a bundle 3. The bundle 3 is inserted through an entry opening 9 into a receiving sleeve 4 which is part of a connector element, in this case of a cable shoe 10, the connector eyelet 11 of which adjoins a widened end piece 5 of the receiving sleeve 4 in unipartite fashion. The individual conductors 2 project into the widened end piece 5. The bundle 3 is equipped with an insulator 13 as far as the receiving sleeve 4. It is however also possible, for safety reasons, for the insulator 13 to extend into the receiving sleeve 4. A region of the bundle 3 to be joined is however stripped if a materially bond to the receiving sleeve 4 is provided. Depending on the design or configuration of the insulator, and depending on the requirements with regard to the quality of the welded connection, a stripping process may however not be imperatively necessary.

By means of a spur 6 which is inserted into the bundle 3, the individual strands 2 are pushed to the side in the widened end piece 5, such that an engagement hollow 7 is formed on the bundle end.

To stabilize the entire system, a setting device 8 is provided which supports the receiving sleeve 4.

The spur 6 serves simultaneously as a welding tool element, for example as a rotary friction welding tool element for a friction welding process by means of which at least a subset of the individual strands 2 are joined to one another and/or to the inner wall of the receiving sleeve 4. The spur 6 may alternatively be a welding tool element for some other welding method, for example a sonotrode for a torsional ultrasonic welding method. During the introduction of the welding energy, the welding tool element and thus the spur 6 are pressed against the individual conductors 2, such that a compaction at the bundle end is attained during the plasticization or melting of individual conductor regions.

In the variant illustrated, the conical profiles of the outer wall of the spur 6 and of the inner wall of the end piece 5 are parallel to one another. Owing to the reduction of the packing density of the individual conductors 2 in the widened end piece 5, said individual conductors 2 fill the space between the inner wall of the widened end piece 5 and the outer wall of the spur 6 to ever decreasing degree with increasing radius. This need not be disadvantageous, as joining connections produced in the relatively compact part of the bundle 3 may entirely suffice. It would alternatively be possible for the spur 6, which functions for example as a friction welding tool element or as a sonotrode, to perform a pivoting movement during the welding process, such that the individual conductors 2 are, in succession, pressed in compact fashion against the inner wall of the widened end piece 5 and integrally connected to said inner wall and/or to one another.

By means of a fixing device 12 (only partially illustrated here), the receiving sleeve 4 is crimped to the bundle 3, whereby non-positively locking and positively locking fixing is realized. Said fixing is preferably performed before the welding process in order to assist the latter.

The fixing device 12 and setting device 8 are removed after the welding process, such that a configured cable 1 remains. The spur 6 may likewise be removed though may also remain as part of the configured cable 1—if said spur is not fixed or is detachably fixed to the rest of the welding tool.

FIGS. 3 and 4 show the end of a fully configured cable in a perspective plan view in complete form (FIG. 3) and in a section (FIG. 4) with the bundle 3, the receiving sleeve 4, the widened end piece 5 of the receiving sleeve and the connector eyelet 11.

FIG. 5 is an illustration similar to FIG. 1. FIG. 5, however, by contrast to FIG. 1, does not show the connection of a stranded wire cable to a connector element but rather schematically shows the formation of an end node 14. For this purpose, individual conductors 15 of two or more stranded wire cables are combined as a bundle 17 in a receiving sleeve 16. The individual conductors 15 project into a widened end piece 18 of the receiving sleeve 16. The stranded wire cables (not separately illustrated) that are combined in the end node 14 may be equipped with an insulator 19 up to a point a short distance from the receiving sleeve 4, which insulator is merely symbolically indicated here and may in fact be provided around each individual stranded wire cable. It is self-evidently also possible for the bundle 17 of the combined individual conductors 15 to be equipped with an insulator within the receiving sleeve 16.

By means of a spur 20 which engages into the end of the bundle 17, the individual conductors 15 are pushed to the side in the widened end piece 18, such that an engagement hollow 21 is formed on the end of the bundle 3. To stabilize the entire system, a setting device 22 is provided which supports the receiving sleeve 16 and which is preferably of at least two-part form for ease of removal of the finished end node 14.

The spur 20 simultaneously serves as an element of a welding tool, for example of a rotary friction welding tool, by means of which at least a subset of the individual conductors 15 are welded to one another and/or to the inner wall of the receiving sleeve 18. The spur 20 may alternatively be a welding tool element for some other welding method, for example a sonotrode for a torsional ultrasonic welding method.

With regard to the conical shape of the spur 20 and of the inner wall of the widened end piece 18, and the interaction thereof, reference is made to the corresponding description relating to FIG. 1. By means of a setting device 23, which is only partially illustrated here, the receiving sleeve 16 is crimped to the bundle 17, whereby a non-positively locking and positively locking fixing is realized. Said fixing is preferably performed before the welding process in order to assist the latter. The spur 20, setting device 22 and fixing device 23 are removed after the welding process, such that a finished end node 14 of multiple stranded wire cables remains.

FIG. 6 schematically shows the production of an end node from individual conductors 15. The end node 24 does not have a receiving sleeve. The bundle 25 of individual conductors 15 is surrounded, in a clamping device 26, by an insulator 27 and is clamped there by way of a cross-sectional reduction of the bundle 25 along the entire clamping device 26. The stripped end 28 of the bundle 25 is delimited laterally by a setting device 29.

The stripped end 28 is engaged into from above by a welding tool 30 which, on its front end, has a spur 31 of frustoconical form as an engagement element. The spur 31 produces an engagement hollow in the stripped bundle end 28. Welding energy may already be introduced to produce the engagement hollow. The compaction of the individual conductor material in the bundle end attained as a result of the plasticization or melting of parts of the individual conductors 15, with a contact pressure simultaneously being exerted by way of the welding tool 30, makes it possible for the engagement hollow to be formed even without widening of the bundle end.

By means of the welding tool 30, welding energy is introduced into the stripped end 28 of the bundle 25, such that the individual conductors 15 of the bundle 25 are materially joined to one another. The distance to which the joining process penetrates into the bundle 15 proceeding from the welding tool 30 is dependent on the duration of action, the contact pressure of the welding tool 30, the type of welding process and the power introduced.

FIG. 7 shows a further end node 32, wherein in this case, the bundle 25 of individual conductors 15 is again surrounded by a receiving sleeve 33. By means of a fixing device 34, non-positively locking fixing of the bundle 25 in the receiving sleeve 33 is attained by way of a cross-sectional reduction of the receiving sleeve 33 with the bundle 25 situated therein. By way of their upper ends, the receiving sleeve 33 and bundle 25 project into a setting device 35 which has a tool receptacle 36.

For the joining process, a welding tool 37 is lowered with a frustoconical spur 38 into the open end of the bundle 25, whereby an engagement hollow is produced in the end of the bundle 25. The spur 38 is surrounded by a ring-shaped receptacle 39 which receives the individual conductors 15 and the receiving sleeve 33 at their respective ends. At the outside, the ring-shaped receptacle is surrounded by an encircling side wall 40. When the welding tool 37 is pressed on, it is now possible for the welding energy to be imparted to the assembly composed of bundle 25 and receiving sleeve 33 over the entire surface area of the spur 38, the base of the receptacle 39, and the inner side of the side wall 40. In this way, the quality of the joining connection can be increased. The tool receptacle 36 furthermore permits a deflection of the receiving sleeve 33 and of the individual conductors 15 in an outward direction as the welding tool 37 is lowered.

Both in the case of the device as per FIG. 6 and in the case of the device as per FIG. 7, the welding tool 30 or 37, the setting devices 29 or 35 and the clamping device 26 or the fixing device 34, respectively, are removed after the joining process.

FIGS. 8a to 14b show, in detail views, welding tools with different geometries at their end provided for engagement into a bundle of individual strands. All of the geometries may be used both in variants in which the bundle of individual strands is surrounded by a receiving sleeve and in variants in which no receiving sleeve is used. Furthermore, there are no restrictions with regard to the presence of an insulator in the joining region. Furthermore, all of the illustrated geometries of welding tools may be used both for the production of end nodes, including a terminating end of an individual stranded wire cable, and for the production of a connection of one or more stranded wire cables to a connector element (see for example FIG. 1).

The method variants illustrated in FIGS. 5 to 7 may each also be implemented with or without a receiving sleeve and with or without an insulator, and may serve for the formation of an end node and for the formation of a connection to a connector element, for example a cable shoe.

Figure 8A:
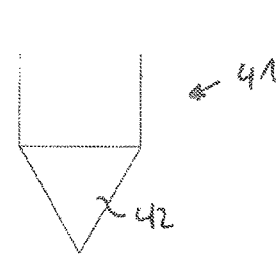
Figure 8B:
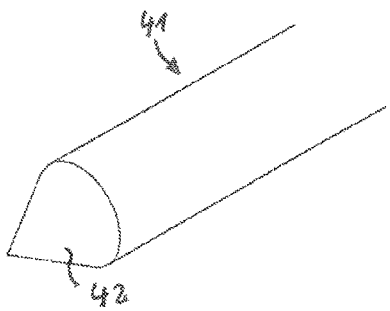

FIGS. 8a and 8b show, in a cross section and in a prospective oblique view, the tip of a welding tool 41 with a conical spur 42 which tapers to a point.

Figure 9A:
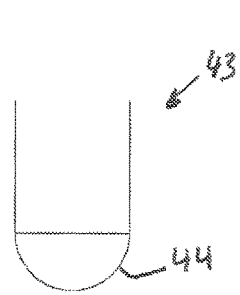
Figure 9B:
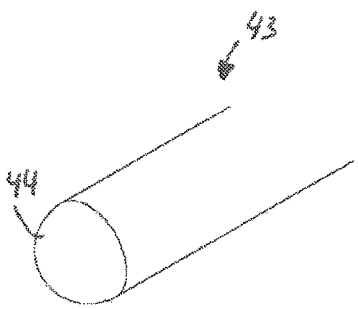

In FIGS. 9a and 9b, a welding tool 43 has a hemispherical spur 44.

FIGS. 10a and 10b show a welding tool 45 with a frustoconical spur 46, wherein the spur 46 is also surrounded by a ring-shaped shoulder 47.

FIGS. 11a and 11b show a welding tool 48 with a likewise frustoconical spur 49 which is surrounded, at the shoulder 50 and adjacent to the shoulder 50, by a beveled edge 51. The beveled edge 51 can facilitate the entry of a welding tool 48, in particular if the individual conductors are surrounded by a sleeve whose inner diameter is equal to or smaller than the outer diameter of the welding tool 48.

The size of the end surface of the frustum of the spur 49 may be dependent on the material of the individual conductors. For example, in the case of relatively brittle material of the individual conductors, a relatively large end diameter could be expedient in order to prevent the individual conductors from breaking away and, in the case of a rotating tool action, to prevent the material of the individual conductors from possibly being centrifugally flung outward, such as could occur in the case of penetration of a pointed spur without sufficient prior plasticization or melting of parts of the individual conductors. This consideration self-evidently also applies in the case of non-frustoconical shapes of the spur.

FIGS. 12a and 12b show a welding tool 52 which does not have a spur but has a hemispherical receptacle 52 which can receive the upper end of an individual conductor bundle with or without a receiving sleeve.

Figures 13A, 13B:
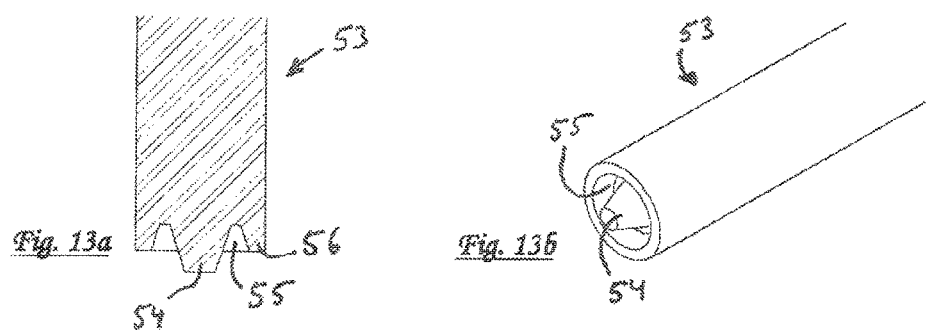

FIGS. 13a and 13b show a welding tool 53 with a frustoconical spur 54 which is surrounded by a ring-shaped receptacle 55 which is surrounded at the outside by an encircling side wall 56. The welding tool 53 of FIGS. 13a and 13b corresponds to the welding tool 37 in FIG. 7.

Figures 14A, 14B:
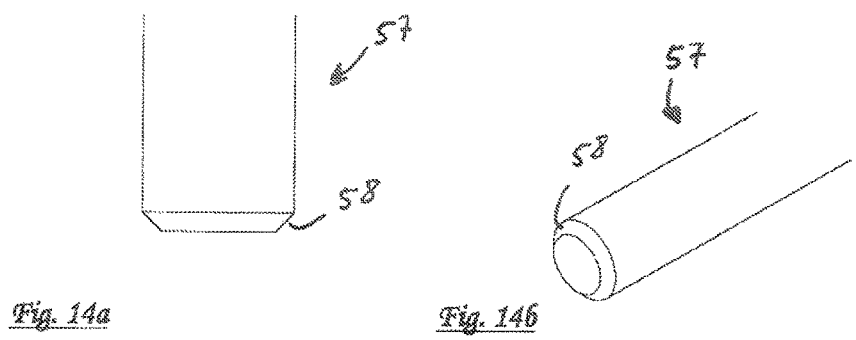

Finally, FIGS. 14 and 14b show a welding tool element 57 which merely has a bevel 58 on the front edge. Using this, or using a variant without a bevel 58, it would be possible to generate a cable end without an engagement hollow.

LIST OF REFERENCE NUMERALS

1 Stranded wire cable
2 Individual conductor

3 Bundle
4 Receiving sleeve
5 End piece
6 Spur
7 Engagement hollow
8 Setting device
9 Entry opening
10 Cable shoe
11 Terminal eyelet
12 Fixing device
13 Insulator
14 End node
15 Individual conductor
16 Receiving sleeve
17 Bundle
18 Widened end piece
19 Insulator
20 Spur
21 Engagement hollow
22 Setting device
23 Fixing device
24 End node
25 Bundle
26 Clamping device
27 Insulator
28 Stripped end
29 Setting device
30 Welding tool
31 Spur
32 End node
33 Receiving sleeve
34 Fixing device
35 Setting device
36 Tool receptacle
37 Welding tool
38 Spur
39 Ring-shaped receptacle
40 side wall
41 Welding tool
42 Spur
43 Welding tool
44 Spur
45 Welding tool
46 Spur
47 Shoulder
48 Welding tool
49 Spur
50 Shoulder
51 Beveled edge
52 Receptacle
53 Welding tool
54 Spur
55 Ring-shaped receptacle
56 Side wall
57 Welding tool
58 Bevel

The invention claimed is:

1. A method for joining an open bundle end of individual strands that extend in a longitudinal direction at a cable end, the method comprising:
mounting a welding tool element onto the open bundle end by applying a contact pressure in the longitudinal direction of the open bundle end;
introducing welding energy to the individual strands by friction welding with a rotating welding tool element;
removing the welding tool element from the open bundle end; and
forming an engagement hollow into the open bundle end, wherein the engagement hollow is configured to engage with an engagement pin of the welding tool element,
wherein at least a portion of the welding energy introduced to the individual strands is introduced via the engagement hollow.

2. The method claimed in claim 1, further comprising introducing at least a portion of the open bundle end into a receptacle formed by a depression in the welding tool element.

3. The method claimed in claim 1, further comprising using the engagement pin of the welding tool element to form the engagement hollow in the open bundle end.

4. The method claimed in claim 3, wherein the engagement pin is an integral part of the welding tool element.

5. The method claimed in claim 1, wherein the engagement pin is an integral part of the welding tool element.

6. The method claimed in claim 1, wherein the welding tool element comprises a ring-shaped receptacle that encircles the engagement pin and that is formed by a depression, and wherein the method further comprises receiving at least a portion of the open bundle end in the ring-shaped receptacle.

7. The method claimed in claim 1, further comprising inserting the open bundle end into a receiving sleeve prior to the mounting of the welding tool element.

8. The method claimed in claim 7, further comprising crimping the receiving sleeve and the cable end together.

9. The method claimed in claim 1, wherein individual strands of at least two cables are combined.

10. The method claimed in claim 1, wherein the individual strands are joined to a terminal element provided for electrical contacting.

11. A method for joining at an open bundle end of individual strands of at least one cable end, the method comprising:
mounting a welding tool element onto the open bundle end by applying a contact pressure acting in a longitudinal direction of the open bundle end;
introducing welding energy into the individual strands by friction welding by using at least one of a rotating welding tool element or torsional-ultrasound welding; and
removing the welding tool element from the open bundle end,
wherein the enemy introduced to the individual strands includes introducing welding energy by a resistance welding process.

12. The method claimed in claim 11 further comprising inserting the open bundle end into a receiving sleeve prior to the mounting of the welding tool element.

13. The method claimed in claim 12, wherein the receiving sleeve comprises a widened end piece, and wherein the engagement hollow of the open bundle end is arranged in the widened end piece.

14. A method for joining individual strands at an open bundle end of a cable, the method comprising:
inserting the open bundle end into a receiving sleeve;
mounting a welding tool element onto the open bundle end, inserted into the receiving sleeve, with a contact pressure acting in a longitudinal direction of the individual strands;
introducing welding energy to the individual strands by friction welding with a rotating welding tool element or by applying torsional ultrasound welding; and
removing the welding tool element from the open bundle end, wherein the receiving sleeve comprises a widened end piece, and wherein an engagement hollow of the open bundle end is arranged in the widened end piece, and during the welding, at least a portion of the ends of the individual strands that surround the engagement hollow are pressed by the welding tool element against an inner wall of the end piece of the receiving sleeve.

15. The method claimed in claim 14, wherein the welding tool element is operated by at least one of pivoting or rotating movement in the engagement hollow during the pressing of the individual strands.

16. A cable composed of a bundle of individual strands and comprising:
   a receiving sleeve having an opening for the bundle of the individual strands, wherein the receiving sleeve has an end piece that is widened relative to the opening and that has a bond between at least one of: (a) a subset of the individual strands, (b) a subset of the individual strands and the receiving sleeve, and (c) a subset of the individual strands and a bond between at least a subset of the individual strands and the receiving sleeve,
   an engagement hollow, formed in the open bundle end, that engages with an engagement pin of a rotating welding tool element,
   wherein the bond is produced by friction welding using the rotating welding tool element.

17. The configured cable claimed in claim 16, wherein said receiving sleeve is part of a terminal element for electrical contacting.

18. The configured cable claimed in claim 16, wherein the end piece is widened in conical fashion.

19. The configured cable claimed in claim 16, wherein the receiving sleeve and the bundle are crimped together outside of the widened end piece.

* * * * *